United States Patent [19]

Buchroeder

[11] 4,278,330

[45] Jul. 14, 1981

[54] CATADIOPTRIC VIRTUAL-ZOOM OPTICAL SYSTEM

[75] Inventor: Richard A. Buchroeder, Tucson, Ariz.

[73] Assignee: Applied Systems Corporation, Vienna, Va.

[21] Appl. No.: 38,953

[22] Filed: May 14, 1979

[51] Int. Cl.³ .................. G02B 15/16; G02B 17/08
[52] U.S. Cl. ........................ 350/411; 350/442
[58] Field of Search ............ 350/199, 184, 200, 201, 350/186

[56] References Cited

U.S. PATENT DOCUMENTS

| 2,778,272 | 1/1957 | Reymond | 350/184 |
| 3,152,214 | 10/1964 | Korones | 350/199 |
| 3,529,888 | 9/1970 | Buchroeder | 350/199 |

*Primary Examiner*—Conrad J. Clark
*Attorney, Agent, or Firm*—Mason, Kolehmainen, Rathburn & Wyss

[57] ABSTRACT

A zoom optical system utilizes a virtual object relay system in order to obtain compact size in a large aperture instrument while minimizing chromatic aberration. The size may further be reduced by employing limited amounts of special optical materials for some of the lens elements.

15 Claims, 10 Drawing Figures

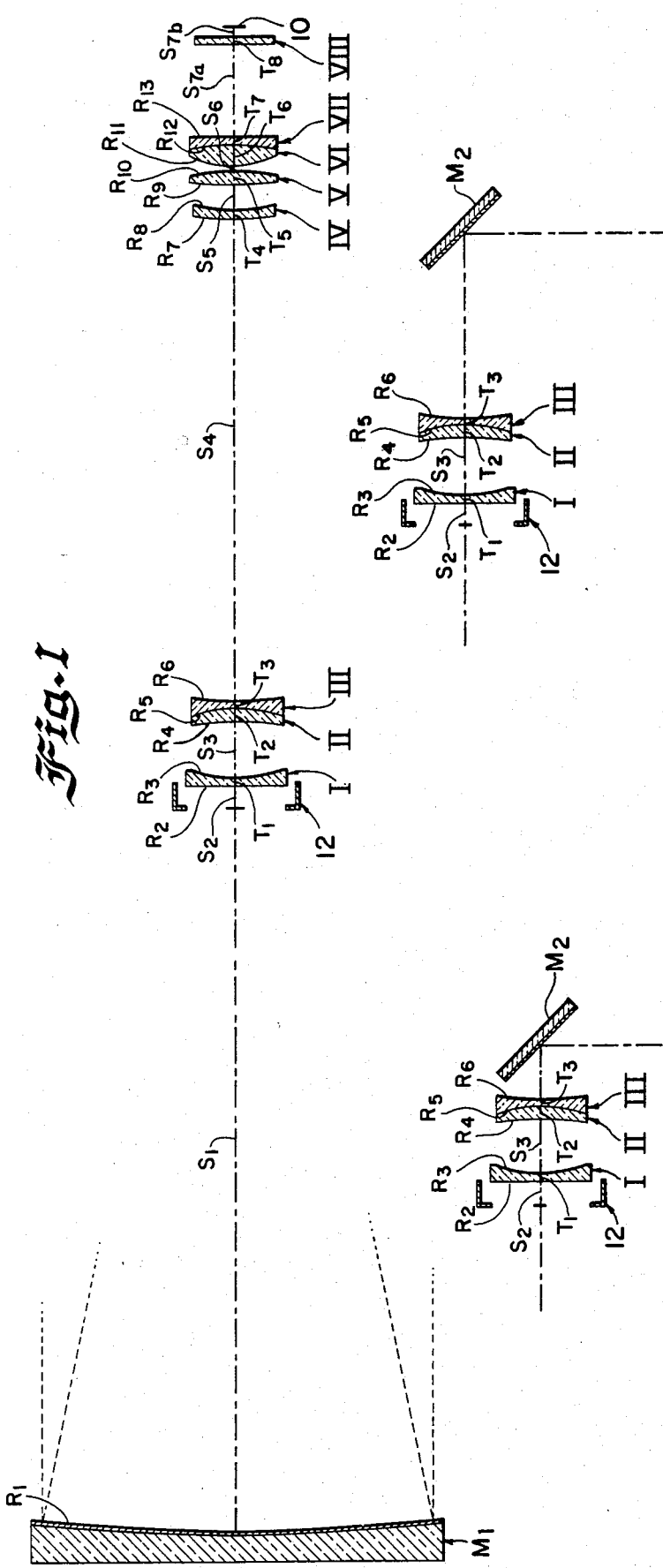
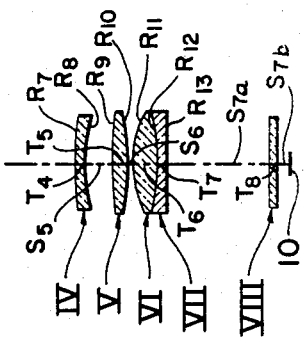
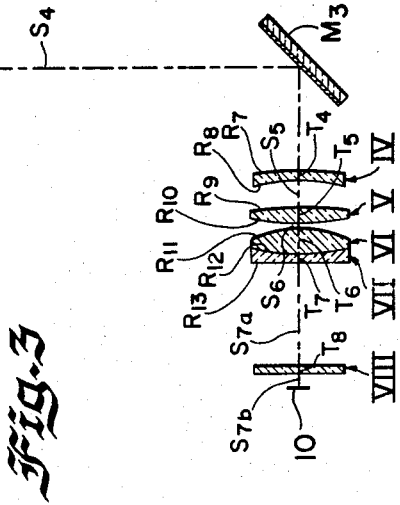

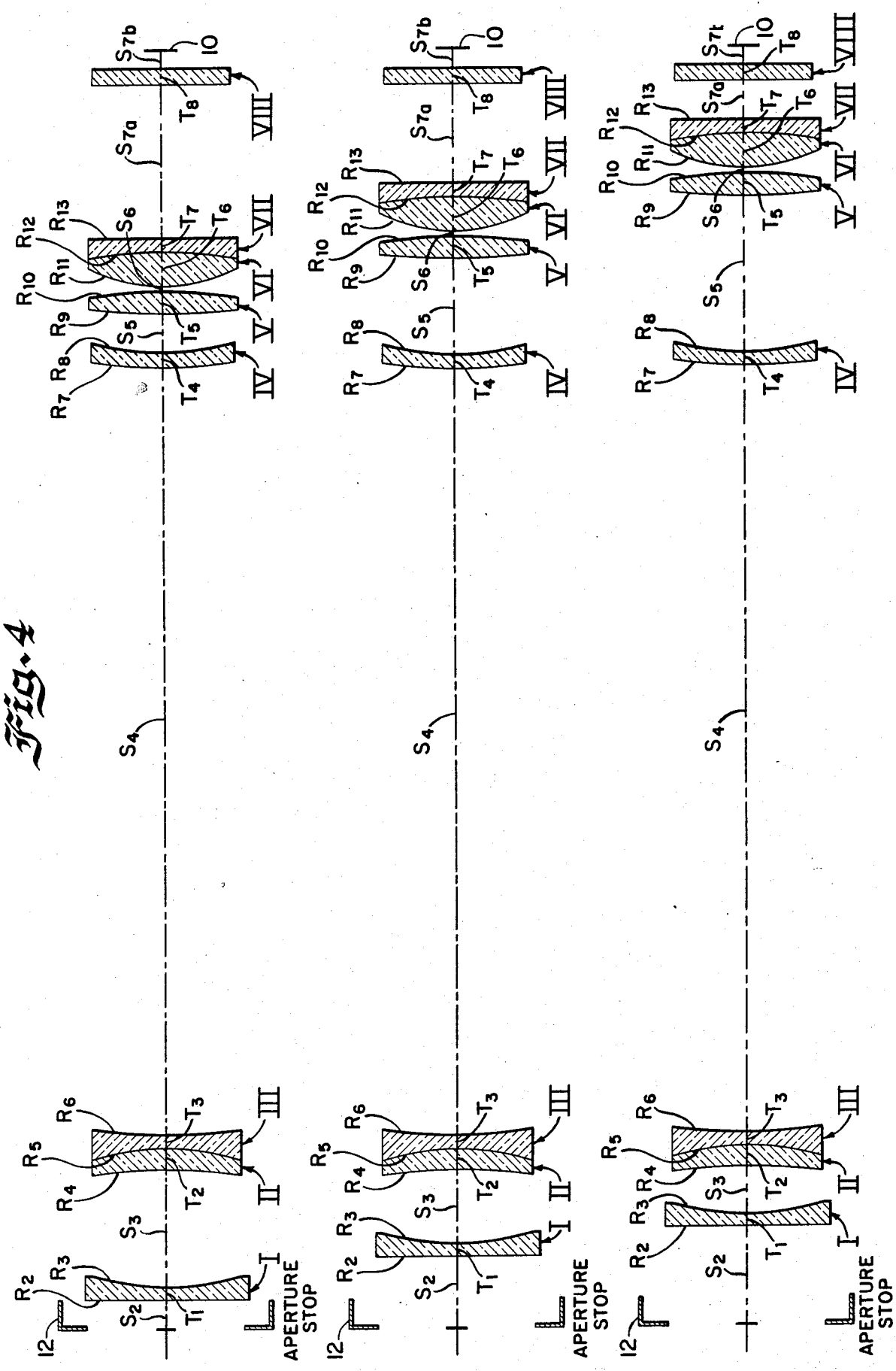

Fig. 5

| ELEMENT | $n_D$ | $\nu_D$ | RADIUS | THICKNESS | SEPARATION |
|---|---|---|---|---|---|
| $M_1$ | — | — | $R_1$=-2000.00 PARABOLIC | — | $S_1$ =785.622 |
| APERTURE STOP | — | — | FLAT | — | $S_2$=VARIABLE |
| I | 1.4339 | 95.14 | $R_2$= FLAT $R_3$= 115.75 | $T_1$= 6.35 | $S_3$=VARIABLE |
| II | 1.6540 | 39.62 | $R_4$=-453.68 $R_5$=-119.83 | $T_2$= 11.43 | — |
| III | 1.4339 | 95.14 | $R_5$=-119.83 $R_6$= 340.45 | $T_3$= 6.35 | $S_4$=508.00 |
| IV | 1.7550 | 27.57 | $R_7$= 354.70 $R_8$= 141.00 | $T_4$= 6.35 | $S_5$=VARIABLE |
| V | 1.6203 | 60.32 | $R_9$= 1589.80 $R_{10}$=-191.67 | $T_5$= 10.16 | $S_6$= 0.508 |
| VI | 1.6203 | 60.32 | $R_{11}$= 85.05 $R_{12}$=-167.55 | $T_6$= 17.78 | — |
| VII | 1.7550 | 27.57 | $R_{12}$=-167.55 $R_{13}$= FLAT | $T_7$= 6.35 | $S_7$=$S_{7a}$+$S_{7b}$ =VARIABLE |
| VIII | 1.523 NOMINAL | 58.6 NOMINAL | FLAT | $T_8$= 6.00 | |

Fig. 6

| FOCAL LENGTH | $S_2$ | $S_3$ | $S_5$ | $S_7$ |
|---|---|---|---|---|
| 900 | 8.834 | 62.615 | 8.630 | 110.469 |
| 1200 | 23.435 | 48.014 | 24.046 | 95.053 |
| 1500 | 31.172 | 40.277 | 36.525 | 82.574 |
| 1800 | 35.757 | 35.692 | 47.291 | 71.808 |
| 2100 | 38.671 | 32.778 | 56.902 | 62.197 |
| 2400 | 40.613 | 30.836 | 65.677 | 53.422 |
| 2700 | 41.950 | 29.499 | 73.818 | 45.281 |
| 3000 | 42.889 | 28.560 | 81.458 | 37.641 |
| 3300 | 43.559 | 27.890 | 88.692 | 25.407 |
| 3600 | 44.039 | 27.410 | 95.588 | 23.511 |
| 3900 | 44.382 | 27.067 | 102.197 | 16.902 |
| 4100 | 44.598 | 26.851 | 105.600 | 13.500 |

Fig. 7

| ELEMENT | $n_D$ | $\nu_D$ | RADIUS | THICKNESS | SEPARATION |
|---------|-------|---------|--------|-----------|------------|
| $M_1$ | — | — | $R_1$=-2000.00 PARABOLIC | — | |
| APERTURE STOP | — | — | FLAT | — | $S_1$ = 785.622 |
| I | 1.4865 | 84.46 | $R_2$=FLAT<br>$R_3$= 124.02 | $T_1$= 6.35 | $S_2$ =VARIABLE |
| II | 1.6540 | 39.62 | $R_4$=-1884.17<br>$R_5$= -118.27 | $T_2$= 11.43 | $S_3$ =VARIABLE |
| III | 1.4865 | 84.46 | $R_5$= -118.27<br>$R_6$= 279.93 | $T_3$= 6.35 | — |
| IV | 1.8049 | 25.42 | $R_7$= 331.82<br>$R_8$= 140.44 | $T_4$= 6.35 | $S_4$=508.00 |
| V | 1.6203 | 60.32 | $R_9$= 728.47<br>$R_{10}$=-212.23 | $T_5$= 10.16 | $S_5$ =VARIABLE |
| VI | 1.6203 | 60.32 | $R_{11}$= 85.60<br>$R_{12}$=-180.44 | $T_6$= 17.78 | $S_6$= 0.508 |
| VII | 1.7550 | 27.57 | $R_{12}$= 180.44<br>$R_{13}$= FLAT | $T_7$= 6.35 | — |
| VIII | 1.523 NOMINAL | 58.6 NOMINAL | FLAT | $T_8$= 6.00 | $S_7=S_{7a}+S_{7b}$<br>=VARIABLE |

Fig. 8

| FOCAL LENGTH | $S_2$ | $S_3$ | $S_5$ | $S_7$ |
|--------------|-------|-------|-------|-------|
| 900 | 8.840 | 68.078 | 8.786 | 108.923 |
| 1200 | 22.889 | 54.029 | 23.916 | 93.793 |
| 1500 | 30.320 | 46.599 | 36.199 | 81.511 |
| 1800 | 34.718 | 42.200 | 46.799 | 70.911 |
| 2100 | 37.513 | 39.405 | 56.257 | 61.453 |
| 2400 | 39.376 | 37.542 | 64.886 | 52.824 |
| 2700 | 40.660 | 36.258 | 72.883 | 39.826 |
| 3000 | 41.565 | 35.354 | 80.381 | 37.328 |
| 3300 | 42.211 | 34.707 | 87.473 | 30.237 |
| 3600 | 42.676 | 34.242 | 94.227 | 23.483 |
| 3900 | 43.010 | 33.908 | 100.693 | 17.016 |
| 4100 | 43.219 | 33.700 | 104.040 | 13.670 |

Fig. 9

| ELEMENT | $n_D$ | $\nu_D$ | RADIUS | THICKNESS | SEPARATION |
|---|---|---|---|---|---|
| $M_1$ | — | — | $R_1 = -1041.40$ PARABOLIC | — | |
| | | | | | $S_1 = 335.00$ |
| APERTURE STOP | — | — | FLAT | — | |
| | | | | | $S_2$ = VARIABLE |
| I | 1.6203 | 60.32 | $R_2 = -1122.04$ $R_3 = 111.11$ | $T_1 = 5.08$ | |
| | | | | | $S_3$ = VARIABLE |
| II | 1.7550 | 27.57 | $R_4 = -198.69$ $R_5 = -82.29$ | $T_2 = 7.62$ | |
| | | | | | — |
| III | 1.6203 | 60.32 | $R_5 = -82.29$ $R_6 = -166.79$ | $T_3 = 5.08$ | |
| | | | | | $S_4 = 203.20$ |
| IV | 1.7550 | 27.57 | $R_7 = 416.23$ $R_8 = 93.46$ | $T_4 = 5.08$ | |
| | | | | | $S_5$ = VARIABLE |
| V | 1.6203 | 60.32 | $R_9 = 380.00$ $R_{10} = -146.62$ | $T_5 = 10.16$ | |
| | | | | | $S_6 = 0.508$ |
| VI | 1.6203 | 60.32 | $R_{11} = 60.17$ $R_{12} = -82.29$ | $T_6 = 17.78$ | |
| | | | | | — |
| VII | 1.7550 | 27.57 | $R_{12} = -82.29$ $R_{13} = 380.00$ | $T_7 = 5.08$ | |
| | | | | | $S_7 = S_{7a} + S_{7b}$ = VARIABLE |
| VIII | 1.523 NOMINAL | 58.6 NOMINAL | FLAT | $T_8 = 6.00$ | |

Fig. 10

| FOCAL LENGTH | $S_2$ | $S_3$ | $S_5$ | $S_7$ |
|---|---|---|---|---|
| 300 | 7.534 | 57.620 | 7.468 | 65.852 |
| 350 | 20.531 | 44.623 | 13.033 | 60.303 |
| 400 | 29.824 | 35.330 | 18.022 | 55.315 |
| 450 | 36.664 | 28.490 | 22.561 | 50.775 |
| 500 | 41.820 | 23.334 | 26.736 | 46.600 |
| 550 | 45.783 | 19.370 | 30.608 | 42.728 |
| 600 | 48.882 | 16.272 | 34.226 | 39.110 |
| 650 | 51.338 | 13.815 | 37.627 | 35.709 |
| 700 | 53.310 | 11.844 | 40.842 | 32.495 |
| 750 | 54.908 | 10.246 | 43.894 | 29.443 |
| 800 | 56.215 | 8.939 | 46.803 | 26.533 |
| 850 | 57.291 | 7.863 | 49.586 | 23.750 |
| 900 | 58.154 | 7.000 | 52.492 | 20.844 |

CATADIOPTRIC VIRTUAL-ZOOM OPTICAL SYSTEM

BACKGROUND OF THE INVENTION

1. Field of the Invention

This invention relates to zoom optical systems, and more particularly to a zoom optical system providing a practical way to obtain a moderate to large aperture of approximately 6 inches to more than 16 inches in diameter, and high speed on the order of f/2.25 while maintaining broad spectral image correction. The system is suitable for use with electro-optical detectors as well as photographic emulsions and may be used in reverse as a target projector, light transmitter or collimator optical system. A zoom range having a focal length ratio of at least 3:1 is readily obtainable.

2. Description of the Prior Art

Conventional large aperture sensors (telescopes) use either reflective or catadioptric main optics because the residual chromatic aberrations found in conventional all-refractive lens systems provides unacceptable image quality. Zoom systems in large aperture reflective or catadioptric collector systems generally comprise a main objective coupled with a relay optical system. Fixed focused relay optical systems are common, however, the use of zoom optical relays to date has been exceedingly limited because designs providing acceptably small lens element sizes tend to produce excessively large chromatic aberrations. The designs having acceptable color correction, in turn, result in very large element sizes, and in practice, excessive vignetting.

One of the reasons for the above discussed problem is that the prior art systems utilize a "real object relay system" wherein an image is first formed by a main light collecting objective and relayed by a positive power zoom system. A field lens is sometimes placed near the focus of the main objective to reduce element diameter in the relay zoom group. The real object relay system may be considered as three separate groups, namely, a collimator, a zoom virtual object relay and a decollimator or backing group. Such a system results in a preponderance of positive focusing power with the collimator and decollimator both having positive focusing power. The zoom virtual object relay can be made to have zero focusing power for chromatic considerations, and the field lens has little effect on chromatic aberrations. However, the positive focusing power of the collimator and decollimator results in large chromatic aberrations that must be corrected by extensive use of special refractive material, even though such materials may pose additional problems in obtaining high optical speed. An example of a typical real object relay system is disclosed in U.S. Pat. No. 3,152,214. The aperture and speed of a system of the type disclosed in the aforesaid U.S. Pat. No. 3,152,214 would be limited by practical considerations to the order of approximately four inches and f/4, respectively.

SUMMARY OF THE INVENTION

Accordingly, it is an object of the present invention to provide an improved zoom optical system that overcomes many of the disadvantages of the prior art zoom optical systems.

It is another object of the present invention to provide a zoom optical system that provides good color quality with relatively small lens element diameters.

It is yet another object of the present invention to provide an improved zoom lens system that provides larger apertures and higher speeds than prior art systems having comparable size lenses.

It is still another object of the present invention to provide an improved zoom lens system that minimizes the use of special or exotic refractive material.

It is yet another object of the present invention to provide an improved zoom lens system that has large separations between the movable zoom groups to thereby provide a wide zoom range.

In accordance with a preferred embodiment of the present invention, the zoom optical system utilizes a virtual object relay system having widely spaced lenses in place of the real object relay system. The advantage of utilizing a virtual object relay system is that the virtual object relay system does not require the collimator and decollimator, and may comprise only the zoom relay which may be set to have a net power of zero to assure freedom from chromatic residual aberration at one focal length. The design also permits the size of the elements to be reduced through the use of a limited amount of special optical material in critical elements, and does not require special materials for all elements.

BRIEF DESCRIPTION OF THE DRAWING

These and other objects and advantages of the present invention will become readily apparent from the following detailed description and attached drawing, wherein:

FIG. 1 is a diagram illustrating an unfolded embodiment of the invention;

FIGS. 2 and 3 illustrate two folded embodiments of the system according to the invention;

FIG. 4 illustrates the zooming operation of the virtual object relay system;

FIGS. 5 and 6 illustrate the parameters of a first specific embodiment of the zoom system according to the invention;

FIGS. 7 and 8 illustrate the parameters of a second specific embodiment of the zoom system according to the invention; and FIGS. 9 and 10 illustrate the parameters of a third specific embodiment of the zoom system according to the invention.

DETAILED DESCRIPTION OF THE PREFERRED EMBODIMENT

The zoom system according to the invention will be described in conjunction with a single main light gathering parabolic mirror, such as a Newtonian telescope, but could also be used in conjunction with other systems, such as, for example, a catadioptric objective system comprising a refractive element and a non-paraboloidal mirror. In the preferred embodiment of the present invention, the zoom system comprises two pairs of moving group element groups that are widely spaced from each other to provide a wide zoom range and at least one intermediate fixed lens between the two moving groups. However, the system can be designed with more than two movable zooming groups provided that at least two of the moving groups are widely separated.

Referring now to the drawing, with particular attention to FIG. 1, there is shown a first embodiment of an unfolded Newtonian telescope utilizing a zoom system according to the present invention. The design illustrated in FIG. 1 has a 400 mm aperture and a focal length that zooms from 900 mm to 4100 mm to give a zoom range of approximately 4.5:1. The f stop ranges from f/2.25 to f/10.125 and the size of the image 10 is a fixed 18 mm. The same design is illustrated in FIGS. 2 and 3, which show two possible folding configurations, with FIG. 2 showing a single folded configuration and FIG. 3 showing a double folded configuration. The folded configurations result in a more practical design, but the invention will be discussed with reference to the unfolded configuration for purposes of simplicity. However, it should be understood that the flat folding mirrors $M_2$ and $M_3$ have no effect on the design of the system, and do not affect the lens design nor the spacing between the lenses. In a folded system, the spacing between folded lens elements is simply the total distance between the lens elements and the mirror(s).

Specific construction data for one embodiment of the zoom system illustrated in FIGS. 1-4 is given in FIGS. 5 and 6. The radius, thickness and separation dimensions are given in millimeters, and as previously stated, are designed to provide a zoom lens that has a 400 mm aperture, a focal length that zooms from 900 mm to 4100 mm, an f stop range from f/2.25 to f/10.125 with an image size of 18 mm. In the table, $M_1$ identifies the objective mirror and Roman numerals identify the lens element in their respective order from the objective mirror to the focal plane; $\eta_D$ represents the refractive index of each element; $\nu_D$ is the Abbe dispersive number; $R_1$, $R_2$, etc. represent the radii of the successive reflective or refractive surfaces, in order from the objective mirror to the focal plane; $T_1$ and $S_1$, etc. represent the thicknesses of the lens elements and air spaces, respectively from the objective mirror to the focal plane, with $T_1$ being the thickness of the first element I and $S_1$ being the thickness of the first air space between the mirror $M_1$ and an aperture stop 12. In the illustrated embodiment, the separation $S_7$ consists of the total of the two separations $S_{7a}$ and $S_{7b}$ on the opposite sides of the flat element VIII. The dimensions listed in FIGS. 5 and 6 may be normalized to unity focal length by dividing each of the radius, thickness and separation dimensions at a particular focal length setting by the focal length corresponding to that setting. The index of refraction and the Abbe dispersion numbers are not changed by the normalization. After normalization, the radius, thickness and separation of a lens of any focal length may be calculated by multiplying each of the normalized radius, thickness and separation dimensions by the desired focal length. Alternatively, this calculation can be made by taking the ratio of the desired range of focal lengths and the 900 mm to 4100 mm focal length range and multiplying the radius, thickness and separation dimensions by this ratio. However, it should be noted that both of the above renormalization methods assume that the zoom range of approximately 4.5:1 remains constant.

In the illustrated design, which is shown in three zoom positions in FIG. 4, the element IV remains stationary, and zooming is effected by moving the two widely spaced zoom groups which comprise elements I, II, III and V, VI, VII, respectively. The elements I, II and III are positioned in the light beam ahead of the position where the real image would be formed by the mirror $M_1$. The separations $S_1$, $S_4$ and $S_6$ remain fixed at the values illustrated in FIG. 5, and the separations $S_2$, $S_3$, $S_5$ and $S_7$ are varied as a function of focal length as illustrated in FIG. 6. In the design illustrated in FIGS. 5 and 6, most of the elements are fabricated from ordinary optical glass, and only three elements are fabricated from special material, namely, elements I and III, which are fabricated from calcium fluoride and element II which utilizes a more exotic optical glass, such as, for example, Schott KZFS N5 or similar material. Element VIII represents the total windows and filters in the system and is fabricated from ordinary optical glass and has a thickness of 6 mm. The position of the element VIII and the material from which the element VIII is fabricated have very little effect on the operation of the system. However, $S_7$ would be increased by approximately 4 mm if no windows or filters were used.

Another similar design is illustrated in FIGS. 7 and 8. The basic operating principle of the embodiment illustrated in FIGS. 7 and 8 is the same as that illustrated in FIGS. 6 and 7. The number of lenses, as well as the lens configuration are identical for the two embodiments, and the identifying symbols for the various lens elements are the same for the two embodiments, and refer to the elements illustrated in FIGS. 1-4. The main difference between the embodiment illustrated in FIGS. 5 and 6 and the one illustrated in FIGS. 7 and 8 is that the embodiment illustrated in FIGS. 7 and 8 does not use any calcium fluoride but instead uses three elements fabricated from special optical glass, namely, elements I and III which are fabricated from, for example, Schott FK51, or similar material and element II which is fabricated from, for example, Schott KZFS N5 or similar material. The two embodiments have substantially the same characteristics, namely, a 400 mm aperture, a focal length ranging from 900 mm to 4100 mm, an f stop range of f/2.25 to f/10.125 and an 18 mm fixed image size. The two embodiments are shown in order to illustrate the design flexibility of the virtual image relay approach, and how the design may be changed to accommodate various available materials.

A third embodiment is illustrated in FIGS. 9 and 10. As in the previous two embodiments, the embodiment illustrated in FIGS. 9 and 10 operates on the same principle and uses the same number of elements as do the two previously mentioned embodiments; however, the third embodiment uses only conventional glass. Good color correction is obtained by reducing the aperture and zoom range. The embodiment illustrated in FIGS. 9 and 10 has an aperture of 133.3 mm, a focal length range of 300 mm to 900 mm to provide a 3:1 zoom range, a speed of f/2.25 to f/6.75 and an 18 mm fixed image size.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. A zoom optical system comprising a main light gathering objective mirror and a virtual object zoom relay system optically coupled to said main light gathering objective mirror.

2. A zoom optical system as recited in claim 1, wherein said main light gathering objective mirror is a mirror forming part of a Newtonian telescope.

3. A zoom optical system as recited in claim 1, wherein said virtual object zoom relay system comprises a first movable zoom element group comprising a plurality of first lens elements, a second movable zoom element group comprising a plurality of second lens elements, and at least one stationary lens element interposed between said first and second movable zoom element groups.

4. A zoom optical system as recited in claim 3, wherein said first movable zoom element group is positioned ahead of the position where the real image would be formed by the light gathering system.

5. A zoom optical system having design parameters, normalized for a 900-4100 mm focal length range, $F_{900-4100}$, and a zoom range of approximately 4.5:1 represented in the following table:

| ELEMENT | $\eta_D$ | $\nu_D$ | RADIUS | THICKNESS | SEPARATION |
|---|---|---|---|---|---|
| $M_1$ | — | — | $R_1 = 2000.00$ PARABOLIC | — | |
| | | | | | $S_1 = 785.622$ |
| APERTURE STOP | — | — | FLAT | — | |
| | | | | | $S_2 = $ VARIABLE |
| I | 1.4339 | 95.14 | $R_2 = $ FLAT $R_3 = 115.75$ | $T_1 = 6.35$ | |
| | | | | | $S_3 = $ VARIABLE |
| II | 1.6540 | 39.62 | $R_4 = -453.68$ $R_5 = -119.83$ | $T_2 = 11.43$ | |
| | | | | | — |
| III | 1.4339 | 95.14 | $R_5 = -119.83$ $R_6 = 340.45$ | $T_3 = 6.35$ | |
| | | | | | $S_4 = 508.00$ |
| IV | 1.7550 | 27.57 | $R_7 = 354.70$ $R_8 = 141.00$ | $T_4 = 6.35$ | |
| | | | | | $S_5 = $ VARIABLE |
| V | 1.6203 | 60.32 | $R_9 = 1589.80$ $R_{10} = -191.67$ | $T_5 = 10.16$ | |
| | | | | | $S_6 = 0.508$ |
| VI | 1.6203 | 60.32 | $R_{11} = 85.05$ $R_{12} = -167.55$ | $T_6 = 17.78$ | |
| | | | | | — |
| VII | 1.7550 | 27.57 | $R_{12} = -167.55$ $R_{13} = $ FLAT | $T_7 = 6.35$ | | wherein $S_2$, $S_3$, $S_5$ and $S_6$ are defined for various focal lengths by the following table:

| FOCAL LENGTH | $S_2$ | $S_3$ | $S_5$ |
|---|---|---|---|
| 900 | 8.834 | 62.615 | 8.630 |
| 1200 | 23.435 | 48.014 | 24.046 |
| 1500 | 31.172 | 40.277 | 36.525 |
| 1800 | 35.757 | 35.692 | 47.291 |
| 2100 | 38.671 | 32.778 | 56.902 |
| 2400 | 40.613 | 30.836 | 65.677 |
| 2700 | 41.950 | 29.499 | 73.818 |
| 3000 | 42.889 | 28.560 | 81.458 |
| 3300 | 43.559 | 27.890 | 88.692 |
| 3600 | 44.039 | 27.410 | 95.588 |
| 3900 | 44.382 | 27.067 | 102.197 |
| 4100 | 44.598 | 26.851 | 105.600 | wherein $M_1$ identifies an objective light gathering mirror, the Roman numerals I–VII identify the respective lens elements from the mirror to the image plane, $\eta_D$ is the refractive index; $\nu_D$ is the dispersion number, $R_1$–$R_{13}$ represent the radii of successive surfaces from the mirror to the image plane, and $T_1$–$T_7$ and $S_1$–$S_6$ represent the thicknesses of the lens elements and air spaces, respectively, from the mirror to the image plane, with all dimensions being expressed in millimeters, and wherein the design parameters may be renormalized to any other focal length range, $F_{n-4.5n}$, by multiplying each of the surface radii, thicknesses and air spaces by the ratio of $F_n/F_{900}$.

6. A zoom optical system having design parameters, normalized for a 900-4100 mm focal length range, $F_{900-4100}$, and a zoom range of approximately 4.5:1 represented in the following table:

| ELEMENT | $\eta_D$ | $\nu_D$ | RADIUS | THICKNESS | SEPARATION |
|---|---|---|---|---|---|
| $M_1$ | — | — | $R_1 = -2000.00$ PARABOLIC | — | |
| | | | | | $S_1 = 785.622$ |
| APERTURE STOP | — | — | FLAT | — | |
| | | | | | $S_2 = $ VARIABLE |
| I | 1.4865 | 84.46 | $R_2 = $ FLAT $R_3 = 124.02$ | $T_1 = 6.35$ | |
| | | | | | $S_3 = $ VARIABLE |
| II | 1.6540 | 39.62 | $R_4 = -1884.17$ $R_5 = -118.27$ | $T_2 = 11.43$ | |
| III | 1.4865 | 84.46 | $R_5 = -118.27$ $R_6 = 279.93$ | $T_3 = 6.35$ | |
| | | | | | $S_4 = 508.00$ |
| IV | 1.8049 | 25.42 | $R_7 = 331.82$ $R_8 = 140.44$ | $T_4 = 6.35$ | |
| | | | | | $S_5 = $ VARIABLE |
| V | 1.6203 | 60.32 | $R_9 = 728.47$ | $T_5 = 10.16$ | |

-continued

| ELEMENT | $\eta_D$ | $\nu_D$ | RADIUS | THICKNESS | SEPARATION |
|---------|----------|---------|--------|-----------|------------|
|         |          |         | $R_{10} = -212.23$ |  |  |
|         |          |         |        |           | $S_6 = 0.508$ |
| VI      | 1.6203   | 60.32   | $R_{11} = 85.60$ | $T_6 = 17.78$ |  |
|         |          |         | $R_{12} = -180.44$ |  |  |
| VII     | 1.7550   | 27.57   | $R_{12} = 180.44$ | $T_7 = 6.35$ |  |
|         |          |         | $R_{13} = $ FLAT |  |  | wherein $S_2$, $S_3$, $S_5$ and $S_6$ are defined for various focal lengths by the following table:

| FOCAL LENGTH | $S_2$ | $S_3$ | $S_5$ |
|---|---|---|---|
| 900  | 8.840  | 68.078 | 8.786 |
| 1200 | 22.889 | 54.029 | 23.916 |
| 1500 | 30.320 | 46.599 | 36.199 |
| 1800 | 34.718 | 42.200 | 46.799 |
| 2100 | 37.513 | 39.405 | 56.257 |
| 2400 | 39.376 | 37.542 | 64.886 |
| 2700 | 40.660 | 35.258 | 72.883 |
| 3000 | 41.565 | 35.354 | 80.381 |
| 3300 | 42.211 | 34.707 | 87.473 |
| 3600 | 42.676 | 34.242 | 94.227 |
| 3900 | 43.010 | 33.908 | 100.693 |
| 4100 | 43.219 | 33.700 | 104.040 | wherein $M_1$ identifies an objective light gathering mirror, the Roman numerals I–VII identify the respective lens elements from the mirror to the image plane, $\eta_D$ is the refractive index; $\nu_D$ is the dispersion number, $R_1$–$R_{13}$ represent the radii of successive surfaces from the mirror to the image plane, and $T_1$–$T_7$ and $S_1$–$S_6$ represent the thicknesses of lens elements and air spaces, respectively, from the mirror to the image plane, with all dimensions being expressed in millimeters, and wherein the design parameters may be renormalized to any other focal length, $F_{n\text{-}4.5n}$ by multiplying each of the surface radii, thicknesses and air spaces by the ratio of $F_n/F_{900}$.

7. A zoom optical system having design parameters, normalized for a 300–900 mm focal length range, $F_{300}$–900, and a zoom range of approximately 3:1 represented in the following table:

| ELEMENT | $\eta_D$ | $\nu_D$ | RADIUS | THICKNESS | SEPARATION |
|---------|----------|---------|--------|-----------|------------|
| $M_1$   | —        | —       | $R_1 = -1041.40$ PARABOLIC | — |  |
|         |          |         |        |           | $S_1 = 335.00$ |
| APERTURE STOP | — | — | FLAT | — |  |
|         |          |         |        |           | $S_2 = $ VARIABLE |
| I       | 1.6203   | 60.32   | $R_2 = -1122.04$ | $T_1 = 5.08$ |  |
|         |          |         | $R_3 = 111.11$ |  |  |
|         |          |         |        |           | $S_3 = $ VARIABLE |
| II      | 1.7550   | 27.57   | $R_4 = -198.69$ | $T_2 = 7.62$ |  |
|         |          |         | $R_5 = -82.29$ |  |  |
| III     | 1.6203   | 60.32   | $R_5 = -82.29$ | $T_3 = 5.08$ |  |
|         |          |         | $R_6 = -166.79$ |  |  |
|         |          |         |        |           | $S_4 = 203.20$ |
| IV      | 1.7550   | 27.57   | $R_7 = 416.23$ | $T_4 = 5.08$ |  |
|         |          |         | $R_8 = 93.46$ |  |  |
|         |          |         |        |           | $S_5 = $ VARIABLE |
| V       | 1.6203   | 60.32   | $R_9 = 380.00$ | $T_5 = 10.16$ |  |
|         |          |         | $R_{10} = -146.62$ |  |  |
|         |          |         |        |           | $S_6 = 0.508$ |
| VI      | 1.6203   | 60.32   | $R_{11} = 60.17$ | $T_6 = 17.78$ |  |
|         |          |         | $R_{12} = -82.29$ |  |  |
| VII     | 1.7550   | 27.57   | $R_{12} = -82.29$ | $T_7 = 5.08$ |  |
|         |          |         | $R_{13} = 380.00$ |  |  | wherein $S_2$, $S_3$, $S_5$ and $S_6$ are defined for various focal lengths by the following table:

| FOCAL LENGTH | $S_2$ | $S_3$ | $S_5$ |
|---|---|---|---|
| 300 | 7.534  | 57.620 | 7.468 |
| 350 | 20.531 | 44.623 | 13.033 |
| 400 | 29.824 | 35.330 | 18.022 |
| 450 | 36.664 | 28.490 | 22.561 |
| 500 | 41.820 | 23.334 | 26.736 |
| 550 | 45.783 | 19.370 | 30.608 |
| 600 | 48.882 | 16.272 | 34.226 |
| 650 | 51.338 | 13.815 | 37.627 |
| 700 | 53.310 | 11.844 | 40.842 |
| 750 | 54.908 | 10.246 | 43.894 |
| 800 | 56.215 | 8.939  | 46.803 |
| 850 | 57.291 | 7.863  | 49.586 |
| 900 | 58.154 | 7.000  | 52.492 | wherein $M_1$ identifies an objective light gathering mirror, the Roman numerals I–VII identify the respective lens elements from the mirror to the image plane, $\eta_D$ is the refractive index; $\nu_D$ is the dispersion number, $R_1$–$R_{13}$ represent the radii of successive surfaces from the mirror to the image plane, and $T_1$–$T_7$ and $S_1$–$S_6$ represent the thicknesses of lens elements and air spaces, respectively, from the mirror to the image plane, with all dimensions being expressed in millimeters, and wherein the design parameters may be renormalized to any other focal length range, $F_{n\text{-}3n}$, by multiplying each of the surface radii, thicknesses and air spaces by the ratio of $F_n/F_{300}$.

8. A zoom virtual image relay system for use with an objective system having design parameters, normalized for a 900-4100 mm focal length range, $F_{900-4100}$, and a zoom range of approximately 4.5:1 represented in the following table:

| ELEMENT | $\eta_D$ | $\nu_D$ | RADIUS | THICKNESS | SEPARATION |
|---------|----------|---------|--------|-----------|------------|
| I | 1.4339 | 95.14 | $R_2$ = FLAT<br>$R_3$ = 115.75 | $T_1$ = 6.35 | |
| | | | | | $S_3$ = VARIABLE |
| II | 1.6540 | 39.62 | $R_4$ = −453.68<br>$R_5$ = −119.83 | $T_2$ = 11.43 | |
| | | | | | — |
| III | 1.4339 | 95.14 | $R_5$ = −119.83<br>$R_6$ = 340.45 | $T_3$ = 6.35 | |
| | | | | | $S_4$ = 508.00 |
| IV | 1.7550 | 27.57 | $R_7$ = 354.70<br>$R_8$ = 141.00 | $T_4$ = 6.35 | |
| | | | | | $S_5$ = VARIABLE |
| V | 1.6203 | 60.32 | $R_9$ = 1589.80<br>$R_{10}$ = −191.67 | $T_5$ = 10.16 | |
| | | | | | $S_6$ = 0.508 |
| VI | 1.6203 | 60.32 | $R_{11}$ = 85.05<br>$R_{12}$ = −167.55 | $T_6$ = 17.78 | |
| | | | | | — |
| VII | 1.7550 | 27.57 | $R_{12}$ = −167.55<br>$R_{13}$ = FLAT | $T_7$ = 6.35 | | wherein $S_3$ and $S_5$ are defined for various focal lengths by the following table:

| FOCAL LENGTH | $S_3$ | $S_5$ |
|--------------|-------|-------|
| 900 | 62.615 | 8.630 |
| 1200 | 48.014 | 24.046 |
| 1500 | 40.277 | 36.525 |
| 1800 | 35.692 | 47.291 |
| 2100 | 32.778 | 56.902 |
| 2400 | 30.836 | 65.677 |
| 2700 | 29.499 | 73.818 |
| 3000 | 28.560 | 81.458 |
| 3300 | 27.890 | 88.692 |
| 3600 | 27.410 | 95.588 |
| 3900 | 27.067 | 102.197 |
| 4100 | 26.851 | 105.600 | wherein the Roman numerals I–VII identify the respective lens elements from the mirror to the image plane, $\eta_D$ is the refractive index; $\nu_D$ is the dispersion number, $R_1$–$R_{13}$ represent the radii of successive surfaces from the mirror to the image plane, and $T_1$–$T_7$ and $S_3$–$S_6$ represent the thicknesses of lens elements and air spaces, respectively, from the objective to the image plane, with all dimensions being expressed in millimeters, wherein elements I, II and III are positioned in the light path ahead of the position where the real image would be formed by the objective, and wherein the design parameters may be renormalized to any other focal length, $F_{n-4.5n}$ by multiplying each of the surface radii, thicknesses and air spaces by the ratio of $F_n/F_{900}$.

9. A zoom virtual image optical relay system for use with an objective system having design parameters, normalized for a 900-4100 mm focal length range, $F_{900-4100}$, and a zoom range of approximately 4.5:1 for the entire system represented in the following table:

| FOCAL LENGTH | $S_3$ | $S_5$ |
|--------------|-------|-------|
| 9000 | 68.078 | 8.786 |
| 1200 | 54.029 | 23.916 |
| 1500 | 46.599 | 36.199 |
| 1800 | 42.200 | 46.799 |
| 2100 | 39.405 | 56.257 |
| 2400 | 37.542 | 64.886 |
| 2700 | 36.258 | 72.883 |
| 3000 | 35.354 | 80.381 |
| 3300 | 34.707 | 87.473 |
| 3600 | 34.242 | 94.227 |
| 3900 | 33.908 | 100.693 |
| 4100 | 33.700 | 104.040 | wherein $S_3$ and $S_5$ are defined for various focal lengths by the following table:

| ELEMENT | $\eta_D$ | $\nu_D$ | RADIUS | THICKNESS | SEPARATION |
|---------|----------|---------|--------|-----------|------------|
| I | 1.4865 | 84.46 | $R_2$ = FLAT<br>$R_3$ = 124.02 | $T_1$ = 6.35 | |
| | | | | | $S_3$ = VARIABLE |
| II | 1.6540 | 39.62 | $R_4$ = −1884.17<br>$R_5$ = −118.27 | $T_2$ = 11.43 | |
| | | | | | — |
| III | 1.4865 | 84.46 | $R_5$ = −118.27<br>$R_6$ = 279.93 | $T_3$ = 6.35 | |
| | | | | | $S_4$ = 508.00 |
| IV | 1.8049 | 25.42 | $R_7$ = 331.82<br>$R_8$ = 140.44 | $T_4$ = 6.35 | |
| | | | | | $S_5$ = VARIABLE |
| V | 1.6203 | 60.32 | $R_9$ = 728.47<br>$R_{10}$ = −212.23 | $T_5$ = 10.16 | |
| | | | | | $S_6$ = 0.508 |
| VI | 1.6203 | 60.32 | $R_{11}$ = 85.60<br>$R_{12}$ = −180.44 | $T_6$ = 17.78 | |
| | | | | | — |
| VII | 1.7550 | 27.57 | $R_{12}$ = 180.44 | $T_7$ = 6.35 | |

-continued

| ELEMENT | $\eta_D$ | $\nu_D$ | RADIUS | THICKNESS | SEPARATION |
|---|---|---|---|---|---|
| | | | $R_{13}$ = FLAT | | | wherein the Roman numerals I–VII identify the respective lens elements from the mirror to the image plane, $\eta_D$ is the refractive index; $\nu_D$ is the dispersion number, $R_1$–$R_{13}$ represent the radii of successive surfaces from the mirror to the image plane, and $T_1$–$T_7$ and $S_3$–$S_6$ represent the thicknesses of lens elements and air spaces, respectively, from the objective to the image plane, with all dimensions being expressed in millimeters, wherein elements I, II and III are positioned in the light path ahead of the position where the real image would be formed by the objective, and wherein the design parameters may be renormalized to any other focal length, $F_{n\text{-}4.5n}$ by multiplying each of the surface radii, thicknesses and air spaces by the ratio of $F_n/F_{900}$.

10. A zoom virtual image optical relay system for use with an objective system having design parameters, normalized for a 300–900 mm focal length range, $F_{300\text{-}900}$, and a zoom range of approximately 4.5:1 for the entire system represented in the following table:

| ELEMENT | $\eta_D$ | $\nu_D$ | RADIUS | THICKNESS | SEPARATION |
|---|---|---|---|---|---|
| I | 1.6203 | 60.32 | $R_2$ = −1122.04<br>$R_3$ = 111.11 | $T_1$ = 5.08 | |
| | | | | | $S_3$ = VARIABLE |
| II | 1.7550 | 27.57 | $R_4$ = −198.69<br>$R_5$ = −82.29 | $T_2$ = 7.62 | |
| III | 1.6203 | 60.32 | $R_5$ = −82.29<br>$R_6$ = −166.79 | $T_3$ = 5.08 | |
| | | | | | $S_4$ = 203.20 |
| IV | 1.7550 | 27.57 | $R_7$ = 416.23<br>$R_8$ = 93.46 | $T_4$ = 5.08 | |
| | | | | | $S_5$ = VARIABLE |
| V | 1.6203 | 60.32 | $R_9$ = 380.00<br>$R_{10}$ = −146.62 | $T_5$ = 10.16 | |
| | | | | | $S_6$ = 0.508 |
| VI | 1.6203 | 60.32 | $R_{11}$ = 60.17<br>$R_{12}$ = −82.29 | $T_6$ = 17.78 | |
| VII | 1.7550 | 27.57 | $R_{12}$ = −82.29<br>$R_{13}$ = 380.00 | $T_7$ = 5.08 | | wherein $S_3$ and $S_5$ are defined for various focal lengths by the following table:

| FOCAL LENGTH | $S_3$ | $S_5$ |
|---|---|---|
| 300 | 57.620 | 7.468 |
| 350 | 44.623 | 13.033 |
| 400 | 35.330 | 18.022 |
| 450 | 28.490 | 22.561 |
| 500 | 23.334 | 26.736 |

-continued

| FOCAL LENGTH | $S_3$ | $S_5$ |
|---|---|---|
| 550 | 19.370 | 30.608 |
| 600 | 16.272 | 34.226 |
| 650 | 13.815 | 37.627 |
| 700 | 11.844 | 40.842 |
| 750 | 10.246 | 43.894 |
| 800 | 8.939 | 46.803 |
| 850 | 7.863 | 49.586 |
| 900 | 7.000 | 52.492 | wherein the Roman numerals I–VII identify the respective lens elements from the mirror to the image plane, $\eta_D$ is the refractive index; $\nu_D$ is the dispersion number, $R_1$–$R_{13}$ represent the radii of successive surfaces from the mirror to the image plane, and $T_1$–$T_7$ and $S_3$–$S_6$ represent the thicknesses of lens elements and air spaces, respectively, from the objective to the image plane, with all dimensions being expressed in millimeters, wherein elements I, II and III are positioned in the light path ahead of the position where the real image would be formed by the objective, and wherein the design parameters may be renormalized to any other focal length, $F_{n\text{-}3n}$ by multiplying each of the surface radii, thicknesses and air spaces by the ratio of $F_n/F_{300}$.

11. A zoom optical system having design parameters, normalized for a 900–4100 mm focal length range, $F_{900\text{-}4100}$, and a zoom range of approximately 4.5:1 represented in the following table:

| ELEMENT | $\eta_D$ | $\nu_D$ | RADIUS | THICKNESS | SEPARATION |
|---|---|---|---|---|---|
| $M_1$ | — | — | $R_1$ = −2000.00<br>PARABOLIC | — | |
| | | | | | $S_2$ = VARIABLE |
| I | 1.4339 | 95.14 | $R_2$ = FLAT<br>$R_3$ = 115.75 | $T_1$ = 6.35 | |
| | | | | | $S_3$ = VARIABLE |
| II | 1.6540 | 39.62 | $R_4$ = −453.68<br>$R_5$ = −119.83 | $T_2$ = 11.43 | |
| III | 1.4339 | 95.14 | $R_5$ = −119.83<br>$R_6$ = 340.45 | $T_3$ = 6.35 | |
| | | | | | $S_4$ = 508.00 |

-continued

| ELEMENT | $\eta_D$ | $\nu_D$ | RADIUS | THICKNESS | SEPARATION |
|---------|----------|---------|--------|-----------|------------|
| IV | 1.7550 | 27.57 | $R_7 = 354.70$<br>$R_8 = 141.00$ | $T_4 = 6.35$ | |
| | | | | | $S_5 =$ VARIABLE |
| V | 1.6203 | 60.32 | $R_9 = 1589.80$<br>$R_{10} = -191.67$ | $T_5 = 10.16$ | |
| | | | | | $S_6 = 0.500$ |
| VI | 1.6203 | 60.32 | $R_{11} = 85.05$<br>$R_{12} = -167.55$ | $T_6 = 17.78$ | |
| | | | | | — |
| VII | 1.7550 | 27.57 | $R_{12} = -167.55$<br>$R_{13} =$ FLAT | $T_7 = 6.35$ | | wherein $S_2$, $S_3$, $S_5$ and $S_6$ are defined for various focal lengths by the following table:

| FOCAL LENGTH | $S_2$ - 785.622 | $S_3$ | $S_5$ |
|---|---|---|---|
| 900 | 8.834 | 62.615 | 8.630 |
| 1200 | 23.435 | 48.014 | 24.046 |
| 1500 | 31.172 | 40.277 | 36.525 |
| 1800 | 35.757 | 35.692 | 47.291 |
| 2100 | 38.671 | 32.778 | 56.902 |
| 2400 | 40.613 | 30.836 | 65.677 |
| 2700 | 41.950 | 29.499 | 73.818 |
| 3000 | 42.889 | 28.560 | 81.458 |
| 3300 | 43.559 | 27.890 | 88.692 |
| 3600 | 44.039 | 27.410 | 95.588 |
| 3900 | 44.382 | 27.067 | 102.197 |
| 4100 | 44.598 | 26.851 | 105.600 | wherein $M_1$ identifies an objective light gathering mirror, the Roman numerals I–VII identify the respective lens elements from the mirror to the image plane, $\eta_D$ is the refractive index; $\nu_D$ is the dispersion number, $R_1$–$R_{13}$ represent the radii of successive surfaces from the mirror to the image plane, and $T_1$–$T_7$ and $S_2$–$S_6$ represent the thicknesses of lens elements and air spaces, respectively, from the mirror to the image plane, with all dimensions being expressed in millimeters, and wherein the design parameters may be renormalized to any other focal length, $F_{n-4.5n}$ by multiplying each of the surface radii, thicknesses and air spaces by the ratio of $F_n/F_{900}$.

12. A zoom optical system having design parameters, normalized for a 900–4100 mm focal length range, $F_{900}$-4100, and a zoom range of approximately 4.5:1 represented in the following table:

| ELEMENT | $\eta_D$ | $\nu_D$ | RADIUS | THICKNESS | SEPARATION |
|---------|----------|---------|--------|-----------|------------|
| $M_1$ | — | — | $R_1 = -2000.00$<br>PARABOLIC | — | |
| | | | | | $S_2 =$ VARIABLE |
| I | 1.4865 | 84.46 | $R_2 =$ FLAT<br>$R_3 = 124.02$ | $T_1 = 6.35$ | |
| | | | | | $S_3 =$ VARIABLE |
| II | 1.6540 | 39.62 | $R_4 = -1884.17$<br>$R_5 = -118.27$ | $T_2 = 11.43$ | |
| | | | | | — |
| III | 1.4865 | 84.46 | $R_5 = -118.27$<br>$R_6 = 279.93$ | $T_3 = 6.35$ | |
| | | | | | $S_4 = 508.00$ |
| IV | 1.8049 | 25.42 | $R_7 = 331.82$<br>$R_8 = 140.44$ | $T_4 = 6.35$ | |
| | | | | | $S_5 =$ VARIABLE |
| V | 1.6203 | 60.32 | $R_9 = 728.47$<br>$R_{10} = 212.23$ | $T_5 = 10.16$ | |
| | | | | | $S_6 = 0.508$ |
| VI | 1.6203 | 60.32 | $R_{11} = 85.60$<br>$R_{12} = -180.44$ | $T_6 = 17.78$ | |
| | | | | | — |
| VII | 1.7550 | 27.57 | $R_{12} = 180.44$<br>$R_{13} =$ FLAT | $T_7 = 6.35$ | | wherein $S_2$, $S_3$, $S_5$ and $S_6$ are defined for various focal lengths by the following table:

| FOCAL LENGTH | $S_2$ - 785.622 | $S_3$ | $S_5$ |
|---|---|---|---|
| 900 | 8.840 | 68.078 | 8.786 |
| 1200 | 22.889 | 54.029 | 23.916 |
| 1500 | 30.320 | 46.599 | 36.199 |
| 1800 | 34.718 | 42.200 | 46.799 |
| 2100 | 37.513 | 39.405 | 56.257 |
| 2400 | 39.376 | 37.542 | 64.886 |
| 2700 | 40.660 | 36.258 | 72.883 |
| 3000 | 41.565 | 35.354 | 80.381 |
| 3300 | 42.211 | 34.707 | 87.473 |
| 3600 | 42.676 | 34.242 | 94.227 |
| 3900 | 43.010 | 33.908 | 100.693 |
| 4100 | 43.219 | 33.700 | 104.040 | wherein $M_1$ identifies an objective light gathering mirror, the Roman numerals I–VII identify the respective lens elements from the mirror to the image plane, $\eta_D$ is the refractive index; $\nu_D$ is the dispersion number, $R_1$–$R_{13}$ represent the radii of successive surfaces from the mirror to the image plane, and $T_1$–$T_7$ and $S_2$–$S_6$ represent the thicknesses of lens elements and air spaces, respectively, from the mirror to the image plane, with all dimensions being expressed in millimeters, and wherein the design parameters may be renormalized to any other focal length, $F_{n-4.5n}$ by multiplying each of the surface radii, thicknesses and air spaces by the ratio of $F_n/F_{900}$.

13. A zoom optical system having design parameters, normalized for a 300-900 mm focal length range, $F_{300-900}$, and a zoom range of approximately 4.5:1 represented in the following table:

| ELEMENT | $\eta_D$ | $\nu_D$ | RADIUS | THICKNESS | SEPARATION |
|---|---|---|---|---|---|
| $M_1$ | — | — | $R_1 = -1041.40$ PARABOLIC | — | |
| | | | | | $S_2$ = VARIABLE |
| I | 1.6203 | 60.32 | $R_2 = -1122.04$ | $T_1 = 5.08$ | |
| | | | $R_3 = 111.11$ | | |
| | | | | | $S_3$ = VARIABLE |
| II | 1.7550 | 27.57 | $R_4 = -198.69$ | $T_2 = 7.62$ | |
| | | | $R_5 = -82.29$ | | — |
| III | 1.6203 | 60.32 | $R_5 = -82.29$ | $T_3 = 5.08$ | |
| | | | $R_6 = 166.79$ | | |
| | | | | | $S_4 = 203.20$ |
| IV | 1.7550 | 27.57 | $R_7 = 416.23$ | $T_4 = 5.08$ | |
| | | | $R_8 = 93.46$ | | |
| | | | | | $S_5$ = VARIABLE |
| V | 1.6203 | 60.32 | $R_9 = 380.00$ | $T_5 = 10.16$ | |
| | | | $R_{10} = -146.62$ | | |
| | | | | | $S_6 = 0.508$ |
| VI | 1.6203 | 60.32 | $R_{11} = 60.17$ | $T_6 = 17.78$ | |
| | | | $R_{12} = -82.29$ | | — |
| VII | 1.7550 | 27.57 | $R_{12} = -82.29$ | $T_7 = 5.08$ | |
| | | | $R_{13} = 380.00$ | | | wherein $S_2$, $S_3$, $S_5$ and $S_6$ are defined for various focal lengths by the following table:

| FOCAL LENGTH | $S_2 - 335.00$ | $S_3$ | $S_5$ |
|---|---|---|---|
| 300 | 7.534 | 57.620 | 7.468 |
| 350 | 20.531 | 44.623 | 13.033 |
| 400 | 29.824 | 35.330 | 18.022 |
| 450 | 36.664 | 28.490 | 22.561 |
| 500 | 41.820 | 23.334 | 26.736 |
| 550 | 45.783 | 19.370 | 30.608 |
| 600 | 48.882 | 16.272 | 34.226 |
| 650 | 51.338 | 13.815 | 37.627 |
| 700 | 53.310 | 11.844 | 40.842 |
| 750 | 54.908 | 10.246 | 43.894 |
| 800 | 56.215 | 8.939 | 46.803 |
| 850 | 57.291 | 7.863 | 49.586 |
| 900 | 58.154 | 7.000 | 52.492 | wherein $M_1$ identifies an objective light gathering mirror, the Roman numerals I–VII identify the respective lens elements from the mirror to the image plane, $\eta_D$ is the refractive index; $\nu_D$ is the dispersion number $R_1$–$R_{13}$ represent the radii of successive surfaces from the mirror to the image plane, and $T_1$–$T_7$ and $S_2$–$S_6$ represent the thicknesses of lens elements and air spaces, respectively, from the mirror to the image plane, with all dimensions being expressed in millimeters, and wherein the design parameters may be renormalized to any other focal length, $F_{n-3n}$ by multiplying each of the surface radii, thicknesses and air spaces by the ratio of $F_n/F_{300}$.

14. A zoom optical system comprising:
an objective mirror having a predetermined focal length and adapted to form a real image at a predetermined focal plane;
a virtual zoom relay optically coupled to said objective mirror, said relay including a first group of first refractive lens elements positioned ahead of said predetermined focal plane, said first groups including at least one axially movable lens element, said relay further including a second group of second refractive lens elements spaced from said first group by a distance substantially greater than the distance between adjacent lens elements of said first group, said second group including at least one axially movable lens element, said first and second lens elements cooperating to form a real image at a second predetermined focal plane behind the last of said second elements but at no other point.

15. A zoom optical system as recited in claim 14 further including a flat folding mirror interposed between said first group and said second group.

* * * * *